Oct. 26, 1965 E. L. GLASER 3,214,736

MAGNETIC TAPE SCAN WITH FIELD SELECTION

Filed April 20, 1959 3 Sheets-Sheet 1

INVENTOR.
EDWARD L. GLASER
BY
Christie, Parker & Hale
ATTORNEYS.

INVENTOR.
EDWARD L. GLASER
BY
Christie, Parker & Hale
ATTORNEYS.

INVENTOR.
EDWARD L. GLASER
BY Christie, Parker & Hale
ATTORNEYS.

United States Patent Office 3,214,736
Patented Oct. 26, 1965

3,214,736

MAGNETIC TAPE SCAN WITH FIELD SELECTION

Edward L. Glaser, Pasadena, Calif., assignor to Burroughs Corporation, Detroit, Mich., a corporation of Michigan Filed Apr. 20, 1959, Ser. No. 807,609
6 Claims. (Cl. 340—172.5)

This invention relates to electronic digital computer systems and, more particularly, is concerned with automatic scanning of magnetic tape bulk storage for selected portions of stored words for transfer to a computer.

The use of magnetic tape as a bulk storage memory for electronic computers is well known. Information is usually stored on the magnetic tape in the form of words, the words comprising a fixed number of character or digits stored in the form of coded magnetic bits. For example, the word may comprise eleven digits, each digit being stored in binary-coded decimal form on the magnetic tape by means of bits stored in parallel in four separate channels on the magnetic tape. Successive digits are read out serially from the magnetic tape to read out a complete word.

It is desirable to be able to scan magnetic tape at relatively high speed to locate specific information, and then at lower tape speed to read out the specified information from the magnetic tape to the computer when required. It may be desirable in certain business applications to be able to scan the tape for information on the basis of only part of a word. For example, a single word on the tape may contain information as to an insurance policy number and the date of issue. It may be desired to scan the tape for information regarding policies issued on a certain date. Thus only the digits in the word relating to the date would be of interest in scanning the tape.

The present invention provides automatic means by which the programmer can establish a magnetic scan operation, for example, based on any selected portion of a word. In copending application Serial No. 788,822, filed January 26, 1959, now Patent No. 3,161,763, in the name of the present inventor and assigned to the assignee of the present invention, there is described an arrangement by which the programmer can cause only portions of operand words to be used within a computer in the execution of particular commands by means of special digits within the instruction word, which digits indicate the selected portion of the operand word. The portion of the word so selected is called a "field" and the selection of a portion of a word is referred to as "field selection." The invention therein described permits the programmer to incorporate field selection as part of a given instruction by means of two digits which are part of the instruction word. These two digits identify respectively the start of the field and the length of the field in terms of digit positions within a complete word.

According to the present invention field selection is incorporated in a magnetic tape scan operation, again by means of a pair of digits provided in the magnetic tape scan instruction. These two digits identify the start and length of the field within the word, the digits within the field being used to locate information on the tape during the scan operation. A special problem in applying field selection, as described in the above copending application, to a magnetic scan operation arises because the computer must be free to do other operations during the time the magnetic tape is going through a scan operation. This means that the digits identifying the start and length of the field cannot be stored as part of the instruction word in the computer since the instruction word is not stored in the computer for the entire time the tape scanning operation is taking place in the magnetic tape unit.

In brief, the present invention provides in an internally programmed computer having a magnetic tape storage unit in which the digits of words are stored serially, apparatus controlled by the computer for automatically positioning the magnetic tape to read out a word or group of words according to selected digits in the word. The apparatus comprises an addressable memory in the computer for storing operand and instruction words. The instruction words are fetched from memory in predetermined order, each instruction word as fetched being stored temporarily in a register in the computer. Where the instruction calls for a search operation of the magnetic tape, a portion of the instruction is used to transfer a comparison word out of a specified address location in memory. This comparison word is transferred to a register in the magnetic tape unit where it is compared digit by digit serially with digits of successive words on the magnetic tape, the magnetic tape being stopped when a word is found on the magnetic tape which is the same as the word from the computer memory.

To effect field selection, according to the present invention, two digits in the instruction word identify respectively the start and length of the field within the comparison word. In transferring the comparison word from memory to the register in the magnetic tape unit, all digits not within the selected field are modified to a fixed predetermined digit value. In making the comparison in the magnetic tape unit between the words read off tape and the word transferred from memory to the tape unit, this fixed predetermined digit is always interpreted as being equal to any digit in the word read from tape. Thus in effect no comparison takes place between digits outside the selected field in the comparison word. As a result, only the digits within the selected field are effective in making a comparison to locate words on the magnetic tape.

For a more complete understanding of the invention, reference should be had to the accompanying drawings, wherein.

Figure 1:
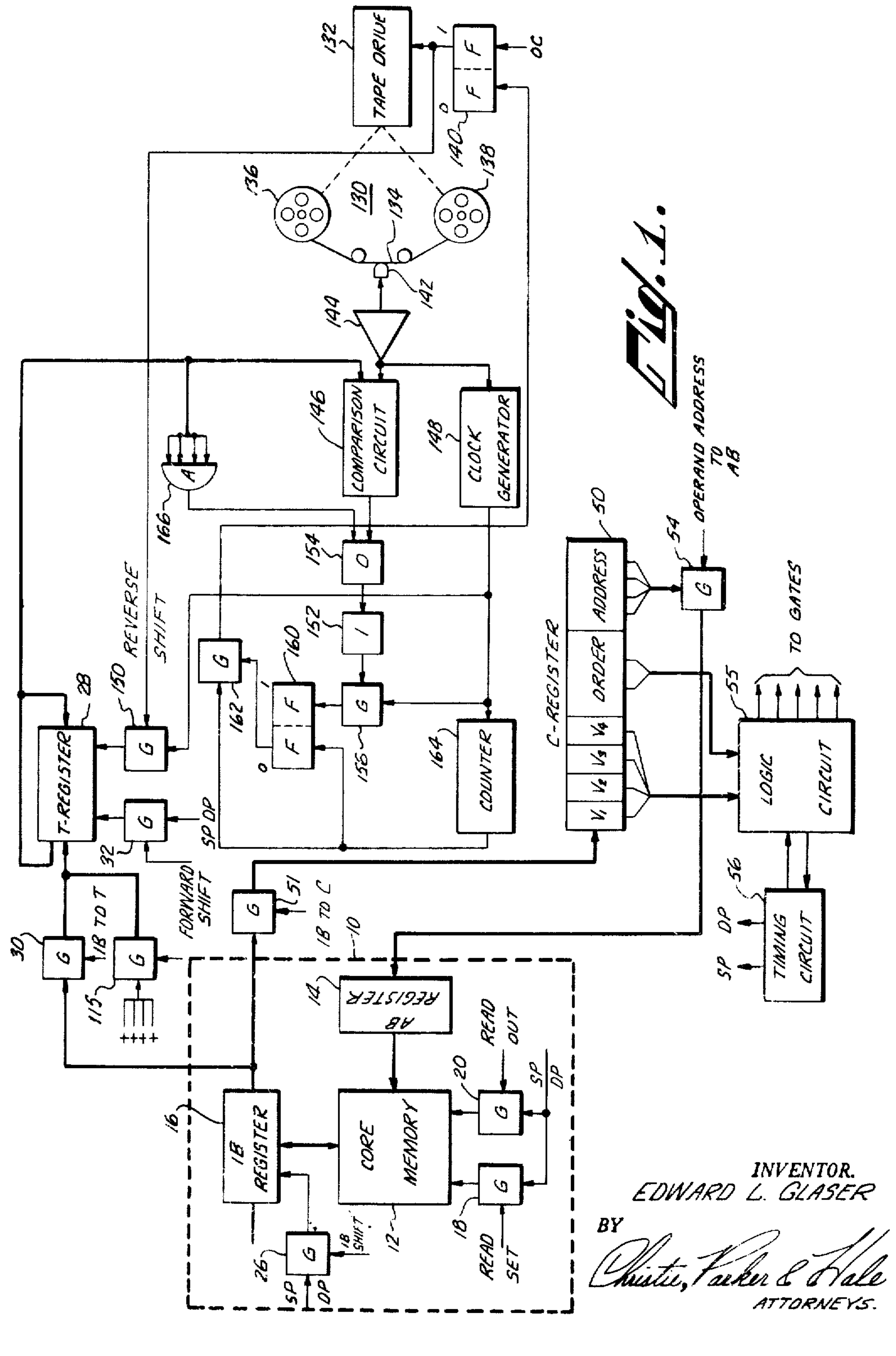
FIG. 1 is a block diagram of the essential portions of a computer and magnetic tape unit embodying the principles of the present invention.

Referring to FIG. 1 there is shown by way of example a block diagram of the basic units of a digital computer of the serial type to which the present invention is applied. While information can be coded in any desired form in the register of the computer, it is assumed that information is represented in binary-coded decimal form, i.e., decimal digits are represented by four binary bits preferably according to a 1, 2, 4, 8 code. This is a conventional code and requires four flip-flops to store four bits representing one decimal digit. The four flip-flops which store one digit are referred to as a decade.

Further, in the computer of FIG. 1 it is assumed that all information is stored in the form of words, the standard word length being ten digits plus a sign digit. The digits comprising words are generally circulated serially, i.e., a digit at a time, in the computer of FIG. 1 by transferring simultaneously in parallel the four bits representing a digit from one decade to another.

Words circulated in the computer are generally of two designated types, namely, operands and instructions. The instruction words have designated digits which represent the order to be executed, such as the order to execute an add cycle, a multiply cycle, or the like. The other designated digits in the instruction word represent the address of operands stored in the memory portion of the computer, each instruction containing the address of the operand to be used in executing the particular instruction.

With these general principles of operation in mind, reference may be had to the details of FIG. 1 in which the numeral 10 indicates generally the memory portion of the computer in which instructions and operands are stored. The memory 10 is preferably of a random access magnetic core type such as described in detail in the book, "Digital Computer Components and Circuits," by R. K. Richards, D. Van Nostrand & Co., 1957, chapter 8. The computer memory includes a core memory circuit 12 which comprises a coincidence core matrix circuit and suitable driver and sensing circuits. Associated with the core memory circuit 12 is an address buffer (AB) register 14 and an information buffer (IB) register 16. The AB-register 14 includes four decades, for example, for storing the digits designating an address location in memory, the levels in the flip-flops of the AB-register 14 being used by the core memory circuit 12 to read in or read out a word from the designated location in the core memory.

The IB-register 16 includes eleven decades for temporarily storing one complete word. Information bits can be transferred in parallel from the flip-flops of the eleven decades to a designated memory location or out of a designated memory location in the core memory circuit 12. A pulse applied through a gate 18 may be used to set the core memory circuit 12 to read out information in a designated address location to the IB-register 16. Actual transfer is effected by a pulse passed by a second gate 20 whereby transfer to the IB-register can be synchronized to take place at a particular pulse time.

Once a word is read into the IB-register 16 of memory, it can be read out serially to a number of different locations in the computer. To this end the IB-register 16 is arranged as four conventional shift registers in parallel for shifting out four bits comprising one digit each time a shift pulse is applied to the register, starting with the four bits defining the least significant digit and ending with the sign digit. To shift information out, shift pulses are applied, as required, to the register through a gate 26.

One route of transfer of words from the IB-register 16 is to a T-register 28, which is a bidirectional shift register for storing one complete word. Transfer is controlled by a gate circuit 30 which controls the transfer of the four bits of each digit transferred. Shifting pulses for shifting the register in the forward direction are applied to the T-register 28 through a gate 32. With the gate 30 open, and shifting pulses applied through open gates 26 and 32, digits are transferred serially from the IB-register 16 into the sign decade end of the T-register 28. After eleven shifting pulses, one complete word is transferred from the register 16 to the register 28.

The instruction word is normally fetched from the memory into a command register 50, designated as the C-register, which is similar to the IB-register 16. Instruction words may be transferred from the IB-register 16 to the C-register 50 through a gate 51. The manner in which an instruction is fetched into the C-register 50 forms no part of the invention but is described in detail in copending application Serial No. 788,823, filed January 26, 1959, in the joint names of the present inventor and Lloyd Cali and assigned to the assignee of the present invention. It is assumed for the purpose of the present description that an instruction word has been stored in the C-register 50 calling for a magnetic tape search operation with field selection.

As pointed out heretofore certain of the digits in the instruction word constitute an address for the operand and memory. These digits are sensed in the first four decades in the righthand end of the C-register, and are transferred in parallel to the AB-register 14 by means of a gating circuit 54. According to the instruction format used in the computer as described, in addition to the first four digits which identify the address location in memory associated with that instruction, the next two digits identify the order to be executed, such as in the present example, the order to execute a magnetic tape search operation. The remaining four digits in the instruction word are referred to as variant digits and may be used for modifying the instruction operation in specified instances, such as effecting field selection according to the present invention. The four decades in the C-register which store the variant decades are designated, from left to right, $V_1$, $V_2$, $V_3$, and $V_4$. The digits stored in the variant portion of the C-register and in the order portion of the C-register are sensed and applied to a logic circuit 55 which together with a timing circuit 56 causes the computer to execute the designated command.

Figure 2:
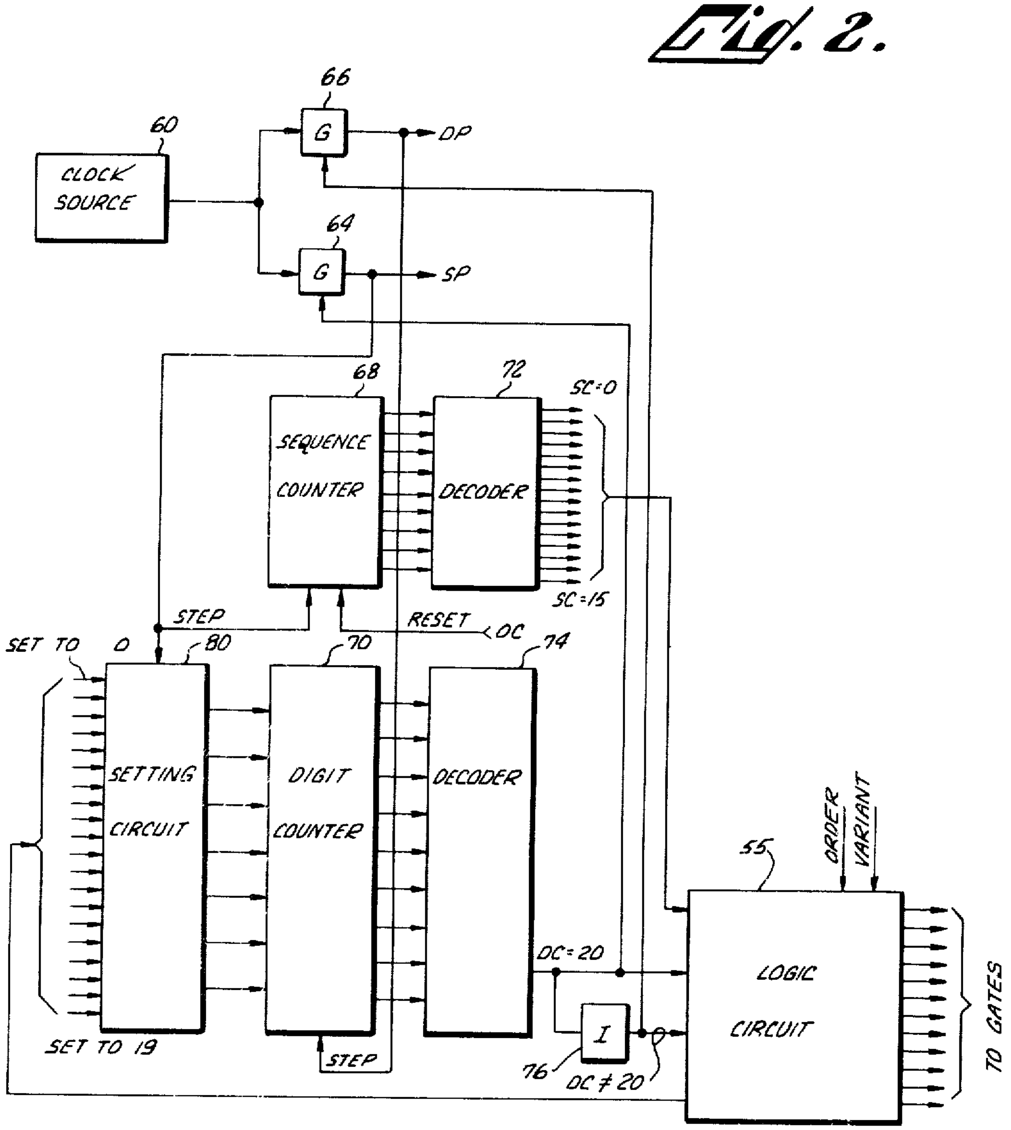
FIG. 2 is a detailed block diagram of the timing portion of the computer central control.

The timing circuit 56, shown in detail in FIG. 2, includes two different counters, a sequence counter 68 and a digit counter 70. The sequence counter 68 may be a conventional straight binary counter having, for example, four flip-flop stages for providing sixteen different binary count conditions. A decoder circuit 72 senses the condition of each of the flip-flops in the counter 68 and raises to a high potential level one of sixteen separate output lines according to the count condition of the sequence counter 68. The decoder 72 may be a conventional diode matrix circuit for converting from binary to decimal form. See, for example, the above-mentioned book by R. K. Richards, pages 56–60. The sixteen output lines are designated SC=0, SC=1, etc.

The sequence counter 68 is reset to zero at the start of each operation of the computer, such as at the start of a fetch operation or the execution of an instruction, by an OC pulse generated at the completion of the previous operation. The sequence counter is counted by SP pulses derived from a clock source 60 through a gate 64.

The digit counter 70 is also a binary counter similar to the counter 68. The digit counter 70 preferably includes five flip-flop stages, enabling it to count to as high as 32. However, it has been found that a count of 20 is adequate for most operations, although this figure is given by way of example only. The digit counter is stepped or counted up by means of DP pulses derived from the clock source 60 through a gate 66. As in the case of the sequence counter 68, a decoder circuit 74 senses the condition of the flip-flop stages in the digit counter 70. However, the decoder 74 need have only one output line which is raised to a high potential level whenever the digit counter 70 is in the count 20 condition designated DC=20. The DC=20 output of the decoder is applied to the gate 64 so that the gate 64 is biased open to pass pulses from the clock source 60 to the sequence counter 68 only when the digit counter 70 is in the count 20 condition. The gate 66 is connected to the output of the decoder 74 through an inverter circuit 76 whereby the gate 66 is biased open whenever the digit counter is in a count condition other than 20, designated ≠20. In other words, SP's are generated whenever the digit counter is equal to 20, and DP's are generated whenever the digit counter is not equal to 20.

The output lines of the decoders 72 and 74 are applied to the logic circuit 55. The logic circuit 55 also senses the digits stored in the order and variant portions of the C-register 50. The logic circuit senses the stepping of the sequence counter 68, and in response to the order being executed as set by the digits in the order portion of the C-register 50, may set the digit counter 70 to any value other than 20 at any step of the sequence counter. This of course interrupts the action of the sequence counter until the digit counter is accomplished through a setting circuit 80, which may be a diode matrix circuit for converting from decimal notation to binary notation. The setting circuit 80 also includes gates on each of the lines to the digit counter 70 by means of which each of the flip-flops in the digit counter 70 may be set to correspond to any decimal digit less than 20 in response to an SP applied to the setting circuit 80. Thus by proper design of the logic circuit 55, any number of DP's can be generated between pairs of SP's for controlling computer operations.

In addition to controlling the sequence of SP's and DP's for each command, the logic circuit, in response to the stepping of the sequence counter 68, provides a series of different gating patterns in carrying out a given instruction, the patterns for each count condition of the sequence counter 68 being different for each instruction. At any given setting of the sequence counter 68, the sequence counter of course may be interrupted and a predetermined number of DP's generated for shifting particular registers and transfer information in the computer.

At this point it should be noted that in executing the search command, field selection is made optional. This is determined by the digit of the command stored in the $V_3$ decade of the C-register 50. If the digit stored in the $V_3$ decade is an even digit this is interpreted by the logic circuit 55 to mean that the entire 11-digit operand word specified by the command address is to be transferred to the T-register 28. If the $V_3$ decade contains an odd digit, this is interpreted to mean that field selection of a group of ten digits or less from the entire word is to be transferred to the T-register. In the latter case, the digits in the variant decade $V_1$ and $V_2$ are used to establish the start of the field and the length of the field respectively. In the field selection of digits in a word, the term "in the field" refers to the group of digits selected by the variant digits of the decades $V_1$ and $V_2$. The term "out of the field" refers to all other digits in the word, which digits may be either to the right or to the left of the field digits or both. For convenience of designation, the digit storing positions in the IB- and T-registers are identified as follows:

The first decade to the left is referred to as the sign decade and it stores the sign digit of the word. The remaining decades of each register and the corresponding digits of the stored word are numbered 1 through 10 going from left to right. If the first digit at the right-hand end of the selected field is to be the digit in the 8 position of the word, for example, the digit 8 will be stored in the variant decade $V_1$. If the first digit in the field is to be the digit in the 10 position, a 0 will be stored in the variant decade $V_1$ of the command register, a 0 being interpreted as a 10 in this case. Similarly, if the field is to consist of five digits, a 5 will be stored in the variant decade $V_2$ of the command register 50, and if it is to consist of ten digits, a 0 will be stored in the variant decade $V_2$ of the command register 50, again a 0 being interpreted as a 10 in this case.

Figure 3:
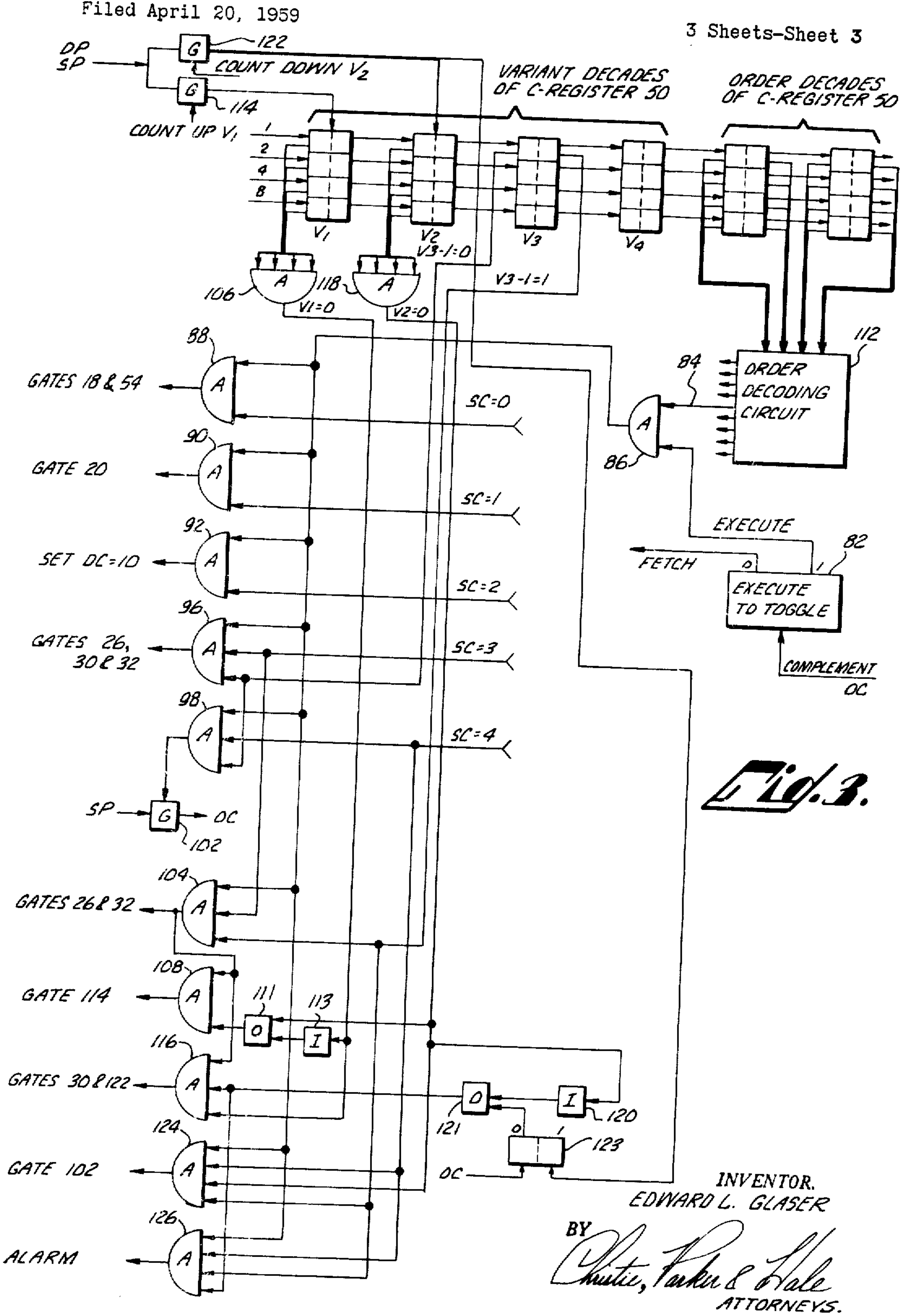
FIG. 3 is a block diagram of the logic circuitry of the computer central control.

Referring now to FIG. 3 in detail, which shows the logic circuit 55 for executing the tape search instruction together with the appropriate decades of the C-register 50, the numeral 82 refers to an Execute toggle or flip-flop which is complemented at the end of each operation by an operation-complete pulse OC. Under normal operation the computer alternately performs a Fetch operation, in which an instruction is fetched from memory to the command register 50, and an Execute operation in which the command stored in the C-register is executed. Such operation is described in more detail in the above-identified copending application. Assuming for the moment that the Fetch operation has been completed and a Search Tape instruction has been transferred to the C-register 50, the Execute toggle 82 will have been complemented to the stable state establishing execution of the instruction by providing a high voltage level in the output designated "Execute" in FIG. 3.

The order digits in the C-register 50 are sensed by an order decoding circut 112 which is a conventional binary-to-decimal converter by means of which the binary coded digits in the two order decades are sensed and caused to energize to a high potential level one of one hundred corresponding output lines. With the order in the command register calling for a Tape Search operation, an output line 84 is raised to a high level. A logical AND circuit 86 senses when the Tape Search instruction is called for by the order decoding circuit 112 and the Execute operation is called for by the Execute toggle 82.

The first operation that the logic circuit 55 must perform in executing the Tape Search command is to transfer the operand in the designated address location of the core memory 12 into the IB-register 16. To this end a logical AND circuit 88 senses the output of the AND circuit 86 and also the SC=0 line from the decoder 72. Thus in the initial condition of the sequence counter 70, the output of the logical AND circuit 88 is raised to a high level during execution of the Tape Search command. This is used to bias open the gate 54 whereby the address digits in the C-register 50 are transferred by the next SP to the AB-register 14 of the memory circuit 10. At the same time, the gate 18 is biased open so that the same SP sets the core memory circuit 12 to the readout condition. The same SP also advances the sequence counter to the next count condition.

With the sequence counter in the next count condition, the SC=1 line is raised to a high level. This is sensed by a logical AND circuit 90 together with the output from the AND circuit 86. The logical AND circuit 90 biases open the gate 20 whereby the next SP causes the selected operand to be shifted in parallel to all the decades of the IB-register 16.

The same SP steps the sequence counter so that the SC=2 line from the decoder 72 is raised to a high level. This is sensed together with the output of the logical AND circuit 86 by a logical AND circuit 92. The output of the logical AND circuit 92 is applied to the DC=10 input line of the setting circuit 80. As a result the digit counter 70 is set to the DC=10 count condition. The SP also steps the sequence counter 68 to the SC=3 count condition.

With the digit counter 70 in the count 10 condition, there are generated ten DP's followed by the next SP, making a group of eleven pulses. These eleven pulses are used to transfer the word in the IB-register 16 to the T-register 28. To this end, the SC=3 line from the decoder 72 is applied to a logical AND circuit 96 together with the output from the logical AND circuit 86. The logical AND circuit 96 is also connected to the flip-flop in the $V_3$ decade of the C-register 50 storing the lowest order bit for determining if the digit stored in the $V_3$ decade is odd or even. If the digit is even, a line $V_3$–1=0 from the lowest order flip-flop is at a high level, which level is applied to the logical AND circuit 96. Thus the output of the logical AND circuit 96 is at a high level only when field selection is not required in the Tape Search operation.

The logical AND circuit 96, when the above conditions are true, biases open the gate 26 for applying shifting pulses to the IB-register 16. It also biases open the gate 30 for passing the digits shifted out of the IB-register 16 to the T-register 28. Also the gate 32 is opened to apply shifting pulses to the T-register 28. The ten DP's plus the following SP shift the registers 16 and 28 eleven times, completing transfer of a complete word. The eleventh pulse, which is an SP, shifts the sequence counter to the SC=4 condition.

A logical AND circuit 98 senses when the sequence counter is in the SC=4 condition as well as sensing the output of the logical AND circuit 86 and the condition of the $V_3$–1=0 line from the variant decade $V_3$. If all conditions are true, the output of the logical AND circuit 98 biases open a gate 102 for passing the next SP, which pulse acts as an operation-complete pulse OC that is used among other operations in the computer to reset the Execute toggle 82 to initiate the next command fetch operation and to reset the sequence counter 70 to zero.

This pulse is also used to start the tape drive, as hereinafter explained in detail.

If the variant digit in the decade $V_3$ is odd, indicating that field selection is to take place with the start of the field represented by the digit in the decade $V_1$ and the length of the field represented by the digit in the decade $V_2$, a slightly different logic sequence takes place. The operation is the same for the SC=0, 1, and 2 conditions as described above. However, when the sequence counter reaches the SC=3 condition, if the variant decade $V_3$ has an odd digit stored in it, the output of a logical AND circuit 104 responsive to the SC=3 line from the decoder 72 and to the output of the logical AND circuit 86, senses the condition of the $V_3$–1=1 line from the variant decade $V_3$. The output of the logical AND circuit 104 biases open the gates 26 and 32. In this manner the shifting pulses are applied to the IB-register 16 and the T-register 28. As long as the digits shifted out of the IB-register are out of the field, it is desired that the gate 30 remain closed so that no information can be shifted into the input of the IB-register 16. At the same time, it is necessary, according to the concept of the present invention, to insert "equality" characters in the digit positions of the T-register that are out of the field.

To this end, a gating circuit 115, see FIG. 1, is provided by means of which high potential levels can be applied to all of the flip-flops of the sign decade of the T-register 28. High levels to all four flip-flops of the sign decade produces a binary-coded fifteen, which in the decimal system is a forbidden combination and normally never exists in the computer. Thus a unique character is established in the T-register when the gate 115 is open. This unique character is used in the Tape Search operation, as hereinafter described, to act as an "equality" character. The gate 115 is open and the gate 30 is closed whenever a digit shifted out of the IB-register 16 is out of the designated field.

To sense whether the digits being shifted out of the IB-register 16 are in the field or out of the field a logical AND circuit 106, see FIG. 3, is connected to each of the flip-flops in the variant decade $V_1$. The output of the logical AND circuit 106 is at a high level when the flip-flops in the variant decade $V_1$ are in the zero condition. An AND circuit 108 is connected to the output of the logical AND circuit 104 and also is connected to the output of the logical AND circuit 106 through a logical OR circuit 111 and an inverter 113. If the variant decade $V_1$ is not equal to zero, the output of the AND circuit 106 is at a low level which is changed to a high level by the inverter 113, this high level being applied through the logical OR circuit 111 to the logical AND circuit 108. Thus if the digit stored in the $V_1$ decade is other than zero, indicating that the first digit in the field is other than the digit in the ten position of the word, the outputs from the AND circuits 104 and 108 are both in a high level condition.

The output of the logical AND circuit 108 is applied to a gate 114, which, when open, passes SP's and DP's from the clock source to a counting input to decade $V_1$. The four flip-flops of the variant decade $V_1$ are arranged to operate as a decimal counter in response to applied counting pulses. It is well known that if four complementing flip-flops are connected in a simple chain circuit, the circuit can be caused to count up or count down, in response to pulses applied to one flip-flop, to any predetermined count condition within the maximum count possible in the counter. See, for example, the book "Digital Computer Components and Circuits" by R. K. Richards, D. Van Nostrand Co., 1957, page 399. Thus the four flip-flops comprising the decade $V_1$ are caused to count up from zero to nine and then return to zero, in response to input pulses passed by the gate 114. In this way if the start of the field is any digit other than the digit in the 10 position, the counter formed by the decade $V_1$ is caused to count up through nine and back to zero. In this manner the logical AND circuit 108 remains open for the number of DP's required to advance the $V_1$ decade counter up through nine and back to zero. For example, if the first digit in the field is to be the digit in the 7 position of the word, a seven is stored in the variant decade $V_1$ as part of the command. Three pulses are required to advance the counter through nine and back to zero. Thus the gate 114 for advancing the decade counter $V_1$ remains open to pass the first three DP's.

After the required number of DP's are passed by the gate 114 to advance the decade $V_1$ counter back to zero, the output level of the logical AND circuit 108 drops. This may require any number of DP's from zero to nine in number. The gate 114 is thereby closed, stopping further counting of the decade counter.

At the same time the gate 30 is opened so that the first digit in the start of the field can be passed to the input of the T-register 28 by the next DP. The gate 30 is controlled by a logical AND circuit 116 connected to the output of the logical AND circuit 104. The logical AND circuit 116 is also connected to the output of the logical AND circuit 106 so that it senses when the decade counter $V_1$ is counted to zero. The logical AND circuit 116 is also coupled to the output of a logical AND circuit 118 through an inverter 120 and a logical OR circuit 121. The logical AND circuit 118 senses the condition of the flip-flops in the variant decade $V_2$ and provides a high level output when the decade $V_2$ is zero. The output of the inverter 120 is at a high level whenever the decade $V_2$ stores a digit other than zero, indicating that the length of the field is some number other than zero.

The variant decade $V_2$ is also arranged as a decimal counter the same as the variant decade $V_1$. However, the decade counter $V_2$ is arranged to count down in response to pulses rather than count up. The count down pulses are applied through a gate 122 which is biased open by the output of the logical AND circuit 116.

As mentioned above, the number indicative of the number of digits in the field is stored in the variant decade $V_2$. Therefore if a 3, for example, is stored in the variant decade $V_2$, three pulses are required to count the decade down to zero. When the decade $V_2$ is counted down to zero, the gate 122 is closed by the logical AND circuit 116. However, the three pulses which count down the counter $V_2$ also permit three digits, corresponding to the length of the field, to be transferred through the open gate 30 from the IB-register into the T-register.

As mentioned above, a zero digit in the variant decade $V_2$ position of the command word is interpreted as a ten, i.e., that the field is to be ten digits in length. However, an initial zero in the variant decade $V_2$ would prevent the logical AND circuit 116 from going high. In order that an initial zero can be interpreted as a field length of ten digits, a logic flip-flop 123 is provided that is initially set by an OC pulse to its zero state. This condition is sensed by the logical AND circuit 116 through the logical OR circuit 121. Even if the output of inverter 120 is low because the variant decade $V_2$ is zero, the flip-flop 123 provides a high level to the logical AND circuit 116. The first pulse passed by the gate 122 steps the variant decade $V_2$ to the 9 count condition and also actuates the flip-flop 123. After the tenth pulse passed by the gate 122, the decade $V_2$ is back to zero, and because the flip-flop 123 has been changed, the output of the logical OR circuit 121 goes low. This results in closing of the gates 30 and 122 to prevent transfer of digits that are out of the field.

When the decade $V_2$ is counted down to zero, the output of the logical AND circuit 118 goes high. This is applied through the logical OR circuit 111 to the logical AND circuit 108. This again causes the gate 115 to open, causing equality characters to replace digits out of the field. While the gate 114 is also opened again, further stepping of the decade counter $V_1$ is of no effect since the decade counter $V_2$ is zero and the flip-flop 123 has not been reset. Therefore no in-the-field condition can again pertain until an OC is produced.

It will be appreciated from the above description that field selection results in selected digits in the field being transferred from the IB-register 26 to the T-register 28. All other digits in the word transferred are changed to the "equality" character fifteen. The first digit in the field to be transferred is deterimned by the digit stored in the variant decade $V_1$ and the number of digits transferred in the field is determined by the digit stored in the variant decade $V_2$.

After ten DP's, the subsequent SP sets the sequence counter to the SC=4 condition. This is sensed by a logical AND circuit 124 which is also connected to the $V_3-1=1$ line for sensing that the field selection is taking place. It also is coupled to the output of the logical AND circuit 118 to determine that the variant decade $V_2$ has been counted down to zero, indicating that the entire field called for has been transferred. If all these conditions are true, the output of the logical AND circuit 124 biases open the gate 102, causing the next SP to generate an OC and start the tape unit.

A logical AND circuit 126 senses the same conditions as the logical AND circuit 124 except that it is connected to the logical AND circuit 118 through the inverter 120. Thus the logical AND circuit 126 provides a high level output when the variant decade $V_2$ has not been counted down to zero. This is used to actuate an alarm, indicating that through some error, the specified field extends beyond the sign of the word.

With the operand stored in the T-register 28, the Tape Search operation is initiated by the OC from the gate 102. The tape unit, as shown in FIG. 1, includes a conventional tape transport indicated generally at 130 which includes a tape drive 132 that drives a magnetic tape 134 between a pair of storage reels 136 and 138. The tape drive 132 is controlled by a flip-flop 140, the tape drive normally being turned off when the flip-flop is in its zero state. The start tape pulse passed by the gate 102 (see FIG. 3) is applied to the flip-flop 140 to set it in its "1" state thereby turning on the tape drive 132 to initiate a Tape Search.

A multiple channel transducer head 142 reads off magnetic bits from the four information channels on the tape. The transducer head 142 is connected to a multi-channel amplifier 144. As the digits are read serially off the magnetic tape, they are applied to the amplifier 144 and then to a comparison circuit 146. The comparison circuit 146 is arranged to compare the digits as serially read from the tape with digits serially read out of the T-register 28.

To shift the digits out of the T-register 28 to the comparison circuit 146, a clock generator 148 is provided which generates a timing clock pulse for each digit that is read off the tape. This may be accomplished in a number of ways such as providing a separate timing track on the magnetic tape or by means of a parity channel on tape so that a magnetic bit is always found in one of five channels on the magnetic tape for each digit position.

The timing pulses from the clock source 148 are passed by a gate 150 which is controlled by the flip-flop 140. Thus the gate 150 is open whenever the tape drive 132 is energized. The pulses passed by the gate 150 are used as reverse shifting pulses for the T-register 28. Because the tape is generally searched by driving it in the backward direction so that it will be in position to read back the word in the forward direction after the word being searched has been read out and compared, the T-register 28 is shifted in the backward direction by the pulses from the gate 150. Thus the digits are shifted out of the sign decade to the second input of the comparison circuit 146. At the same time the digits are reinserted in the other end of the T-register 28 to provide continuous recirculation of the digit stored in the register.

The comparison circuit 146 makes a digit by digit comparison between the word stored in the T-register and the words read out of the magnetic tape. The comparison circuit 146 is arranged to produce a high level output whenever the two digits applied in coded form to the input are equal. This high level output is applied to an inverter 152 through a logical OR circuit 154, the output of the inverter being applied to a gate 156. Thus the gate 156 is biased open whenever the comparison circuit shows a lack of comparison between the two digits applied to the input thereof.

Clock pulses are applied to the gate 156 from the clock source 148 and passed to a flip-flop 160 to set it in its 1 state. Flip-flop 160 is set to its 1 state only in the event a lack of comparison exists between the digits from the tape and the digits from the T-register in the comparison circuit. Otherwise the flip-flop remains in its zero state.

The flip-flop in the zero state biases open a gate 162, the output of which is connected back to the flip-flop 140 so that a pulse passed by the gate 162 will reset the flip-flop 140 to its zero state and stop the tape drive 132.

A pulse is applied to a gate 162 after each complete word is read out from the magnetic tape. This may be accomplished for instance by means of a counter 164 which produces an output pulse following a succession of eleven input pulses, corresponding to the number of digits in one word. The output from the counter 164 is also used to reset the flip-flop 160 at the end of a complete word in the event that a lack of comparison has existed between one of the digits in the word read out from the magnetic tape and the comparison word stored in the T-register 28.

In this manner if all the eleven digits in the word read out of the tape are identical to the eleven digits stored in the T-register 28, gate 162 will remain open at the completion of a word, and the resulting pulse from the counter 164 passed by the gate 162 will stop the tape drive. Thus the tape will be positioned at the beginning of a selected word on the magnetic tape.

Where a comparison is to be made on only a selected field of a complete word on magnetic tape, as indicated above, the digits outside the field are stored as binary coded 15's in the digit position not in the field of C-register 28. A logical AND circuit 166 senses the "equality" character 15, producing a high level output in response thereto which is applied to the OR circuit 154. In this manner the output of the AND circuit 166 has the same effect as an equality indication from the output of the comparison circuit 146. Therefore only digits in the selected field are actually compared with corresponding digits read off the magnetic tape for the purpose of comparison.

From the above description it will readily apparent that the present invention provides means for searching magnetic tape for a particular word or for a particular portion of a word. This is automatically provided by the variant digits in the instructions, which establish the start and length of the selected field. Equality characters are substituted for all digits in the operand transferred to the tape search register outside the selected field of the word. In this way actual comparison between words from the tape during search is made only with digits of the operand within the selected field. The apparatus of the invention perimts the computer to be free during the tape search operation, whether or not field selection is used.

What is claimed is:

1. In an internally programmed computer having a magnetic tape storage unit in which words are stored serially, apparatus controlled by the computer for automatically positioning the tape for locating a word according to selected digits in the word, said apparatus comprising addressable memory means for storing operand and instruction words, a register for storing instruction words, register means for storing an operand word, means responsive to a first group of particular digits stored in the instruction register for initiating readout from the magnetic tape, means responsive to a second group of particular digits stored in the instruction register for transferring a selected operand word from the memory means to the operand word register means, the transferring means including means for selectively modifying any digit transferred to the operand register to a special digit value different from any normal digit in an operand word, first and second counters, means responsive to a pair of digits in the instruction word storage register for setting the counters to preselected count conditions, means for counting the first counter in synchronism with the transfer of digits of the operand word to the operand register, means responsive to the first counter in its zero state for inhibiting said modifying means, whereby the digits are modified during transfer until the first counter is counted to zero, means for initiating counting of the second counter in synchronism with the transfer of digits to the operand register, means responsive to the first and second counters in their zero state for reactivating said modifying means, whereby only those digits of the operand transferred during the counting of the second counter are transferred to the operand register means without modification, means for driving the tape, means for reading out stored digits serially from the tape, means for starting the tape drive after the operand word has been transferred from memory to the operand register and reading out words from tape serially digit by digit, means for transferring another instruction from the memory means to the instruction register when transfer of the selected operand word to said operand word register means is complete, whereby the computer can perform other instructions while the tape is being read, means for shifting the operand register in synchronism with the tape readout, means for comparing each digit of a word read out of tape with each digit shifted out of the operand register to sense for equality, said comparing means including means for interpreting each of said modified digits of special value as equal to any digit from the tape, and means responsive to the comparing means for interrupting the tape drive at the end of a word read out of tape when equality is sensed by the comparing means between all of the digits of the tape word and the word shifted out of the operand register.

2. In an internally programmed computer having a magnetic tape storage unit in which words are stored serially, apparatus controlled by the computer for automatically positioning the tape for locating a word according to selected digits in the word, said apparatus comprising addressable memory means for storing operand and instruction words, register means for storing an operand word, means for transferring a selected operand word from the memory means to the operand word register means, the transferring means including means for selectively modifying any digit transferred to the operand register to a special digit value different from any normal digit in an operand word, first and second counters, means for setting the counters to preselected counter conditions, means for counting the first counter in synchronism with the transfer of digits of the operand word to the operand register, means responsive to the first counter in its zero state for inhibiting said modifying means, whereby the digits are modified during transfer until the first counter is counted to zero, means for initiating counting of the second counter in synchronism with the transfer of digits to the operand register, means responsive to the first and second counter in their zero state for reactivating said modifying means, whereby only those digits of the operand register, means responsive to the first and second counter in their zero state for reactivating said modifying means, whereby only those digits of the operand transferred during the counting of the second counter are transferred to the operand register means without modification, means for driving the tape, means for reading out stored digits serially from the tape, means for starting the tape drive after the operand word has been transferred from memory to the operand register and reading out words from tape serially digit by digit, means for transferring another instruction from the memory means to the instruction register when transfer of the selected operand word to said operand word register means is complete, whereby the computer can perform other instructions while the tape is being read, means for shifting the operand register in synchronism with the tape readout, means for comparing each digit of a word read out of tape with each digit shifted out of the operand register to sense for equality, said comparing means including means for interpreting each of said modified digits of special value as equal to any digit from the tape, and means responsive to the comparing means for interrupting the tape drive at the end of a word read out of tape when equality is sensed by the comparing means between all of the digits of the tape word and the word shifted out of the operand register.

3. In an internally programmed computer having a magnetic tape storage unit in which words are stored serially, apparatus controlled by the computer for automatically positioning the tape for locating a word according to selected digits in the word, said apparatus comprising addressable memory means for storing operand and instruction words, means for transferring a selected operand word serially from the memory means to the operand word register means, the transferring means including means for selectively modifying any digit transferred to the operand register to a special digit value different from any normal digit in an operand word, first and second counters, means for stepping the first counter to a first predetermined count condition in synchronism with the transfer of digits to the operand register, means responsive to the first counter for activating said modifying means during the counting of the first counter, means for activating the second counter when the first counter is advanced to said predetermined count condition, means for stepping the second counter in synchronism with the transfer of digits to the operand register, means for reactivating said modifying means when the second counter is stepped to a predetermined count condition, whereby only those digits of the operand transferred during the counting of the second counter are transferred to the operand register means without modification, means for driving the tape, means for reading out stored digits serially from the tape, means for starting the tape drive after the operand word has been transferred from memory to the operand register and reading out words from tape serially digit by digit, means for transferring another instruction from the memory means to the instruction register when transfer of the selected operand word to said operand word register means is complete, whereby the computer can perform other instructions while the tape is being read, means for shifting the operand register in synchronism with the tape readout, means for comparing each digit of a word read out of tape with each digit shifted out of the operand register to sense for equality, said comparing means including means for interpreting each of said modified digits of special value as equal to any digit from the tape, and means responsive to the comparing means for interrupting the tape drive at the end of a word read out of tape when equality is sensed by the comparing means between all of the digits of the tape word and the word shifted out of the operand register.

4. In an internally programmed computer having a magnetic tape storage unit in which words are stored serially, apparatus controlled by the computer for automatically positioning the tape for locating a word according to selected digits in the word, said apparatus comprising addressable memory means for storing operand and instruction words, an instruction register, means responsive to an instruction word in the instruction register for transferring a selected operand word from the memory means to the operand word register means, the transferring means including means for selectively modifying any digit transferred to the operand register to a special digit value different from any normal digit in an operand word, means for storing a pair of digits indicating the number and position of a selected group of digits within the operand word, means responsive to said pair of digits for inhibiting said modifying means during the transfer of digits in the selected group of digits, means for driving the tape, means for reading out stored digits serially from the tape, means for starting the tape drive after the operand word has been transferred from memory to the operand register and reading out words from tape serially digit by digit, means for transferring another instruction from the memory means to the instruction register when transfer of the selected operand word to said operand word register means is complete, whereby the computer can perform other instructions while the tape is being read, means for comparing the digits of a word read out of tape with the digits in corresponding positions of the operand to sense for equality, said comparing means including means for interpreting each of said modified digits of special value as equal to any digit from the tape, and means responsive to the comparing means for interrupting the tape drive at the end of a word read out of tape when equality is sensed by the comparing means between all of the digits of the tape word and the word shifted out of the operand register.

5. In a computer in which instructions stored in coded form are stored in a memory for execution by the computer in sequence, apparatus for scanning magnetic tape in response to one of said instructions to locate selected words stored on the tape as coded bits according to selected digits in the stored words, comprising means for driving the magnetic tape, means for reading out the stored digits of each word serially from the magnetic tape, a register for storing an operand word, means responsive to a particular instruction in the computer for transferring an operand word from the computer memory to said register, means responsive to the same instruction for modifying selected digits of the operand word stored in said register to a special coded character, means for reading out the modified word from the register without destroying the contents of the register, means for comparing each digit of a succession of words read out of the tape with digits and special characters in corresponding positions of the same modified operand word in the register, said comparing means including means for sensing said special character and interpreting said special character as always the same as any digit of a word read from magnetic tape, and means responsive to the comparing means for automatically stopping the tape following the readout of a word when the unmodified digits of the operand word are the same as corresponding digits in the word read out of the tape.

6. In a computer in which instructions are stored in coded form in a memory for execution by the computer in sequence, apparatus for searching a storage device in response to one of said instructions to locate words in a succession of words according to selected digits in the word, comprising means for reading out in sequence a succession of words stored in the storage device, a register for storing an operand word, means responsive to a particular instruction in the computer for transferring an operand word from the computer memory to said register, means responsive to the same instruction for modifying selected digits in the operand word stored in said register to a special coded character, means for repeatedly reading out the modified word from the register without destroying the contents of the register, means for comparing each digit of the succession of words read out of the storage device with each of the digits and special characters in corresponding positions of the same modified operand word in the register, said comparing means including means for sensing said special character and interpreting said special character as always the same as any digit of a word read from said storage device, and means responsive to the comparing means for generating an output signal following the readout of a word when the unmodified digits of the operand word are the same as corresponding digits in the word read out of the storage device.

References Cited by the Examiner

UNITED STATES PATENTS

| | | | |
|---|---|---|---|
| 2,900,132 | 8/59 | Burns et al. | 340—174 |
| 2,916,210 | 12/59 | Selmer | 340—174 |
| 2,969,913 | 1/61 | Cherin | 235—157 |

OTHER REFERENCES

Pages 49, 58 and 59, copyright 1957, Publication I, "Univac II Data Automation System," Remington Rand Univac.

Pages 18 to 20, published August 1959, Publication II, "Argus-Automatic Routine Generating and Updating System, Honeywell 800 Transistorized Data Processing System."

MALCOLM A. MORRISON, *Primary Examiner.*

EVERETT R. REYNOLDS, IRVING L. SRAGOW, *Examiners.*

UNITED STATES PATENT OFFICE

CERTIFICATE OF CORRECTION

Patent No. 3,214,736

October 26, 1965

Edward L. Glaser

It is hereby certified that error appears in the above numbered patent requiring correction and that the said Letters Patent should read as corrected below.

Column 11, lines 67 to 69, strike out "register, means responsive to the first and second counter in their zero state for reactivating said modifying means, whereby only those digits of the operand".

Signed and sealed this 23rd day of August 1966.

(SEAL)
Attest:

ERNEST W. SWIDER
Attesting Officer

EDWARD J. BRENNER
Commissioner of Patents